(12) United States Patent
Hu et al.

(10) Patent No.: US 11,888,374 B2
(45) Date of Patent: Jan. 30, 2024

(54) OPTICAL ELEMENT DRIVING MECHANISM

(71) Applicant: TDK TAIWAN CORP., Taoyuan (TW)

(72) Inventors: Chao-Chang Hu, Taoyuan (TW); Chen-Hsien Fan, Taoyuan (TW); Shang-Hung Chen, Taoyuan (TW); He-Ling Chang, Taoyuan (TW); Chih-Wei Weng, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 294 days.

(21) Appl. No.: 16/892,819

(22) Filed: Jun. 4, 2020

(65) Prior Publication Data
US 2021/0033880 A1   Feb. 4, 2021

Related U.S. Application Data

(60) Provisional application No. 62/882,165, filed on Aug. 2, 2019.

(30) Foreign Application Priority Data

Feb. 3, 2020   (CN) ......................... 202020150682.5

(51) Int. Cl.
| | |
|---|---|
| G02B 27/64 | (2006.01) |
| H04N 23/68 | (2023.01) |
| G02B 7/04 | (2021.01) |
| H02K 41/035 | (2006.01) |
| H02K 11/215 | (2016.01) |
| H02N 2/04 | (2006.01) |
| H02N 2/06 | (2006.01) |

(52) U.S. Cl.
CPC ......... *H02K 41/0356* (2013.01); *G02B 27/64* (2013.01); *H02K 11/215* (2016.01); *H02N 2/043* (2013.01); *H02N 2/062* (2013.01); *H04N 23/68* (2023.01); *G02B 7/04* (2013.01); *G02B 27/646* (2013.01)

(58) Field of Classification Search
CPC .................................. G02B 27/64; G03B 5/00
See application file for complete search history.

(56) References Cited

U.S. PATENT DOCUMENTS

2013/0136437 A1*   5/2013   Asakawa .............. G02B 27/64
396/55

FOREIGN PATENT DOCUMENTS

WO   WO-2012017839 A1 *   2/2012  .............  G02B 27/64

* cited by examiner

*Primary Examiner* — Minh Q Phan
(74) *Attorney, Agent, or Firm* — MUNCY, GEISSLER, OLDS & LOWE, P.C.

(57) ABSTRACT

An optical element driving mechanism is provided, including a movable portion, a fixed portion, a driving assembly, and an assisting assembly. The movable portion is used for connecting to an optical element having a main axis. The movable portion is movable relative to the fixed portion. The driving assembly is disposed on the movable portion or the fixed portion for driving the movable portion to move relative to the fixed portion. The movable portion is movably connected to the fixed portion through the assisting assembly.

14 Claims, 15 Drawing Sheets

OPTICAL ELEMENT DRIVING MECHANISM

CROSS REFERENCE TO RELATED APPLICATIONS

This application claims the benefit of U.S. Provisional Application No. 62/882,165, filed on Aug. 2, 2019 and China Patent Application No. 202020150682.5, filed on Feb. 3, 2020, which are incorporated by reference herein in their entirety.

BACKGROUND OF THE DISCLOSURE

Field of the Disclosure

The present disclosure relates to an optical element driving mechanism.

Description of the Related Art

As technology has developed, it has become more common to include image-capturing and video-recording functions into many types of modern electronic devices, such as smartphones and digital cameras. These electronic devices are used more and more often, and new models have been developed that are convenient, thin, and lightweight, offering more choices for consumers.

Electronic devices that have image-capturing or video-recording functions normally include a driving mechanism to drive an optical element (such as a lens) to move along its optical axis, thereby achieving auto focus (AF) or optical image stabilization (OIS). Light may pass through the optical element and may form an image on an optical sensor. However, the trend in modern mobile devices is to have a smaller size and a higher durability. As a result, how to effectively reduce the size of the driving mechanism and how to increase its durability has become an important issue.

BRIEF SUMMARY OF DISCLOSURE

An optical element driving mechanism is provided, including a movable portion, a fixed portion, a driving assembly, and an assisting assembly. The movable portion is used for connecting to an optical element having a main axis. The movable portion is movable relative to the fixed portion. The driving assembly is disposed on the movable portion or the fixed portion for driving the movable portion to move relative to the fixed portion. The movable portion is movably connected to the fixed portion through the assisting assembly.

In some embodiments of the present disclosure, the assisting assembly includes a limiting element affixed on the fixed portion. In some embodiments, the assisting assembly further includes a magnetic permeable element and a support element, and the limiting element is disposed between the magnetic permeable element and the support element. In some embodiments, the magnetic permeable element has a trapezoid shape when viewed in a direction that is perpendicular to the main axis. In some embodiments, the fixed portion includes a base having a first opening, the main axis passes through the first opening, and the driving assembly is partially disposed in the first opening. In some embodiments, the fixed portion includes a base having a concave portion, the main axis passes through the concave portion, and the driving assembly is at least partially disposed in the concave portion.

In some embodiments, the driving assembly includes a first magnetic element disposed on the movable portion and a second magnetic element disposed on the fixed portion. In some embodiments, the size of the first magnetic element along the main axis is less than the size of the first magnetic element in a direction that is perpendicular to the main axis. In some embodiments, the fixed portion includes a base having a second opening, and the driving assembly is at least partially disposed in the second opening. In some embodiments, the base includes a main body and a sidewall, the sidewall extends from the main body along the main axis, and the second opening is positioned on the sidewall. In some embodiments, a third opening is formed on the main body.

In some embodiments, the movable portion and the fixed portion have rectangular shapes, a limiting portion is formed on the corner of the movable portion, a corner space is formed on the corner of the fixed portion, and the limiting portion is accommodated in the corner space. In some embodiments, the optical element driving mechanism further includes a blocking element directly disposed on the optical element or the fixed portion. In some embodiments, the optical element driving mechanism is connected to the optical element through an optical module, the optical module has a top surface, the optical element driving mechanism has a top surface and a bottom surface, and the distance between the top surface of the optical module and the bottom surface of the optical element driving mechanism is greater than the distance between the top surface of the optical element driving mechanism and the bottom surface of the optical element driving mechanism.

In some embodiments, the fixed portion and the movable portion include an identical material. In some embodiments, the material includes resin or metal. In some embodiments, the assisting assembly includes a limiting element including a connecting portion affixed on the fixed portion. In some embodiments, the connecting portion has a criss-cross shape. In some embodiments, the optical element driving mechanism further includes a circuit board, and the circuit board and the fixed portion at least partially overlap each other when viewed in a direction that is perpendicular to the main axis. In some embodiments, the fixed portion includes a case, and the circuit board and the case at least partially overlap each other when viewed in the direction that is perpendicular to the main axis.

BRIEF DESCRIPTION OF DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF DISCLOSURE

Figure 1:
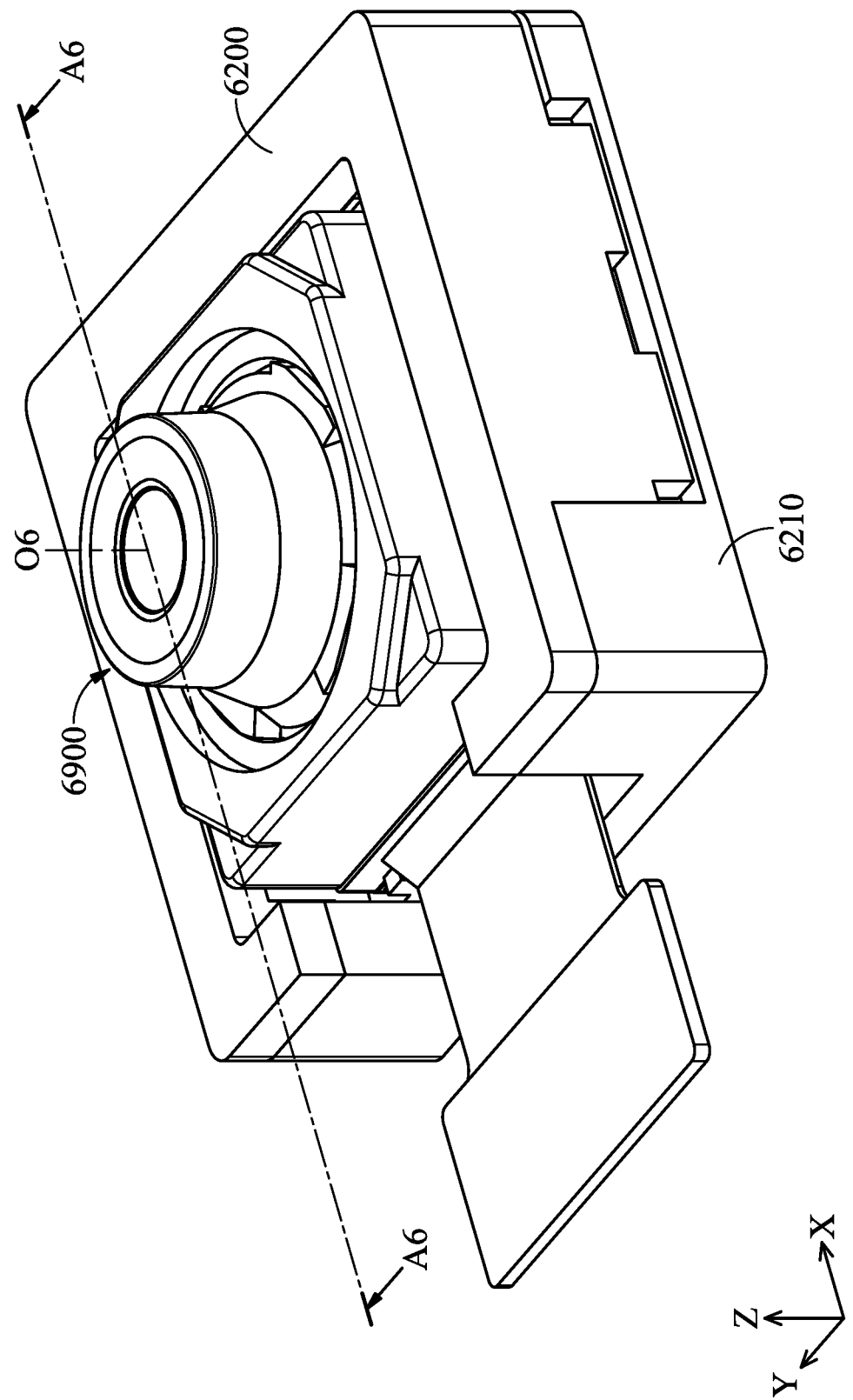
FIG. 1 is a perspective view of an optical element driving mechanism according to some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are in direct contact, and may also include embodiments in which additional features may be disposed between the first and second features, such that the first and second features may not be in direct contact with each other.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In addition, in some embodiments of the present disclosure, terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

Figure 2:
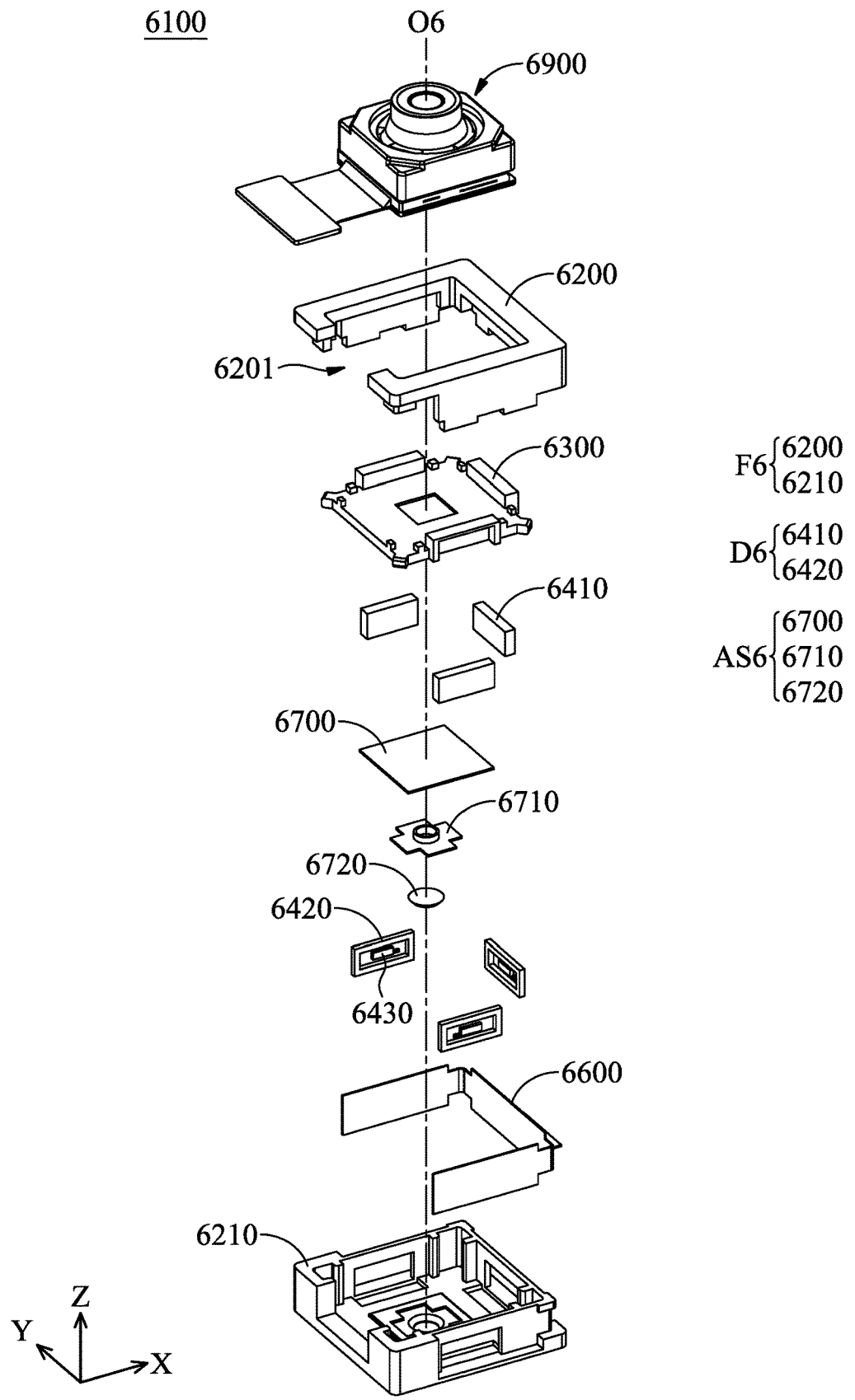
FIG. 2 is an exploded view of the optical element driving mechanism.
Figure 3:
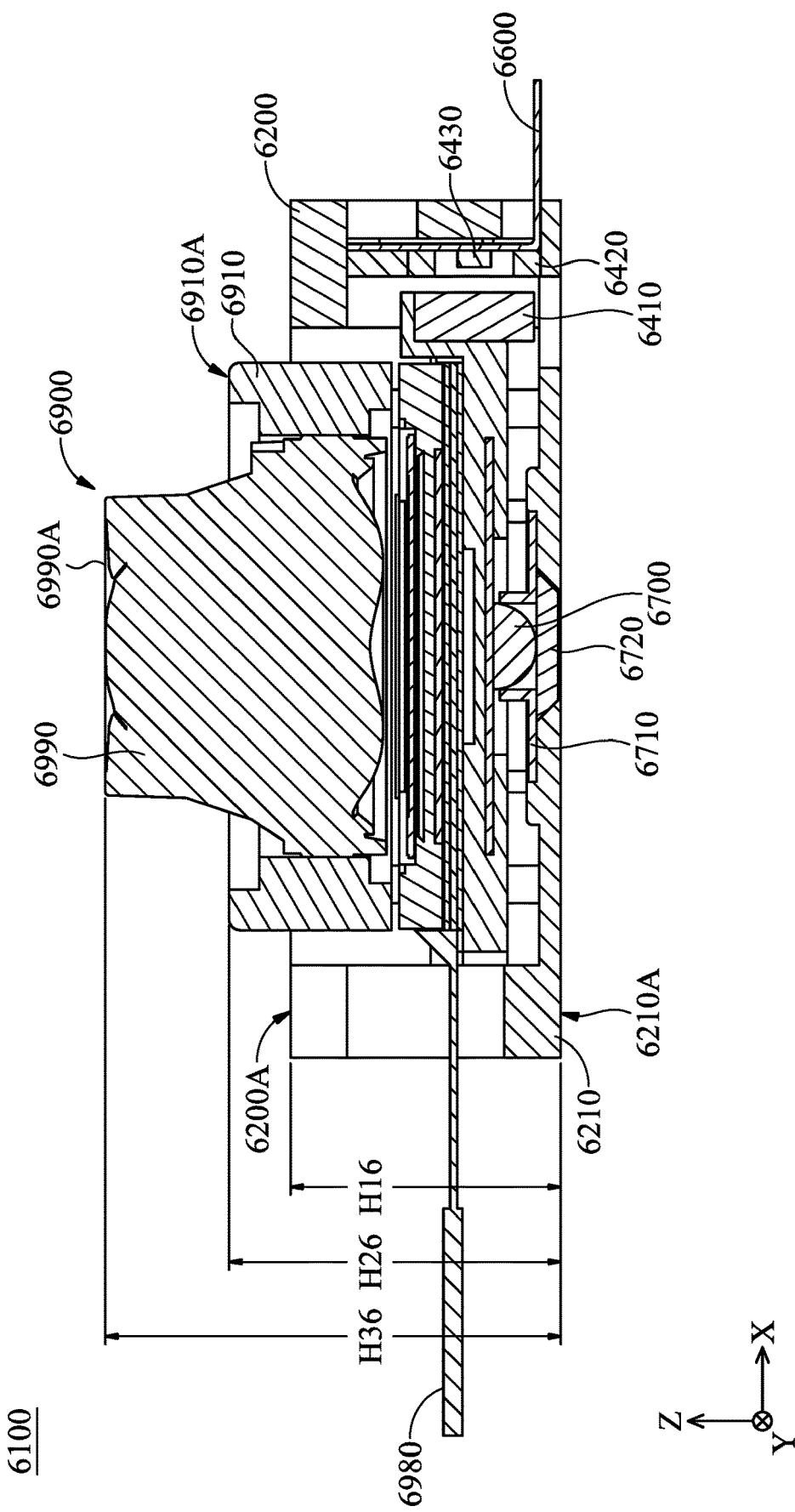
FIG. 3 is a cross-sectional view of the optical element driving mechanism.

In some embodiments of the present disclosure, FIG. 1 to FIG. 3 are a perspective view and an exploded view of an optical element driving mechanism 6100, and a cross-sectional view illustrated along a line A6-A6 in FIG. 1, respectively. In FIG. 2, the optical element driving mechanism 6100 mainly includes a case 6200, a base 6210, a movable portion 6300, a first magnetic element 6410, a second magnetic element 6420, a position sensor 6430, a circuit board 6600, a support element 6700, a limiting element 6710, and a magnetic permeable element 6720. The optical element driving mechanism 6100 may be used for driving an optical module 6900, or may be used for driving various optical elements, such as a lens, a mirror, a prism, a beam splitter, or an aperture.

In some embodiments of the present disclosure, the case 6200 and the base 6210 may be combined to form the outer case of the optical element driving mechanism 6100. Furthermore, the case 6200 and the base 6210 may be called as a fixed portion F6. In some embodiments, an opening 6201 may be formed on the case 6200 to allow some elements disposed in the optical element driving mechanism 6100 being exposed from the fixed portion F6, such as the substrate 6980 in FIG. 3. In some embodiments, the movable portion 6300 is movable relative to the fixed portion F6 (such as including the case 6200 and the base 6210). As a result, the optical module 6900 disposed on the movable portion 6300 may be moved by the movable portion 6300 to achieve auto focus (AF) or optical image stabilization (OIS).

In some embodiments, the fixed portion F6 and the movable portion 6300 may include an identical material, such as metal or resin. As a result, the hardness of the fixed portion F6 may be substantially identical to the hardness of the movable portion 6300, and the fixed portion F6 and the movable portion 6300 may be prevented from being damaged when colliding with each other.

In some embodiments of the present disclosure, the first magnetic element 6410 and the second magnetic element 6420 may be called as a driving assembly D6 to drive the movable portion 6300 moving relative to the fixed portion F6. For example, the first magnetic element 6410 and the second magnetic element 6420 may include a combination of a driving coil and a driving magnet. For example, the first magnetic element 6410 may be a driving magnet, and the second magnetic element 6420 may be a driving coil. In another example, the first magnetic element 6410 may be a coil, and the second magnetic element 6420 may be a driving magnet, and is not limited thereto. The first magnetic element 6410 and the second magnetic element 6420 may be positioned on the fixed portion F6 and the movable portion 6300, respectively. It should be noted that the interaction between the first magnetic element 6410 and the second magnetic element 6420 may create a magnetic force to move the optical module 6900 relative to the fixed portion, so auto focus (AF) or optical image stabilization (OIS) may be achieved. In some embodiments, the driving assembly D6 may include other driving elements, such as piezoelectric elements, shape memory alloys, etc.

In some embodiments of the present disclosure, the first magnetic element 6410 may be disposed on the movable portion 6300, and the second magnetic element 6420 may be disposed on the fixed portion F6, such as affixed on the fixed portion by gluing. As a result, the movable portion 6300 may be moved relative to the fixed portion F6 by the magnetic force generated between the first magnetic element 6410 and the second magnetic element 6420. However, the present disclosure is not limited thereto. For example, the first magnetic element 6410 may be disposed on the fixed portion F6, and the second magnetic element 6420 may be disposed on the movable portion 6300, depending on design requirements.

In some embodiments, the size of the first magnetic element 6410 along the main axis O6 (Z axis) is less than the size of the first magnetic element 6410 in a direction that is perpendicular to the main axis O6 (X or Y axis). As a result, the size of the first magnetic element 6410 may be reduced to achieve miniaturization.

Furthermore, the circuit board 6600 may be, for example, a flexible printed circuit, which may be affixed on the fixed portion F6 by adhesion. In some embodiments, the circuit board 6600 is electrically connected to other electronic elements disposed inside or outside the optical element driving mechanism 6100. For example, the circuit board 6600 may send electric signal to the driving assembly D6 to control the movement of the movable portion 6300.

In some embodiments of the present disclosure, position sensor 6430 may be disposed in the optical element driving mechanism 6100 to detect the position of the movable portion 6300 relative to the fixed portion F6. The position sensor 6430 may include Hall sensor, magnetoresistance effect sensor (MR Sensor), giant magnetoresistance effect sensor (GMR sensor), tunneling magnetoresistance effect sensor (TMR sensor), or fluxgate sensor.

In some embodiments, the support element 6700, the limiting element 6710, and the magnetic permeable element 6720 may be called as an assisting assembly AS6 for limit the movement of the movable portion 6300 relative to the fixed portion F6. Furthermore, the limiting element 6710 may be disposed between the support element 6700 and the magnetic permeable element 6720, and a magnetic force may be generated between the support element 6700 and the magnetic permeable element 6720 to fix the position of the limiting element 6710.

Figure 4:
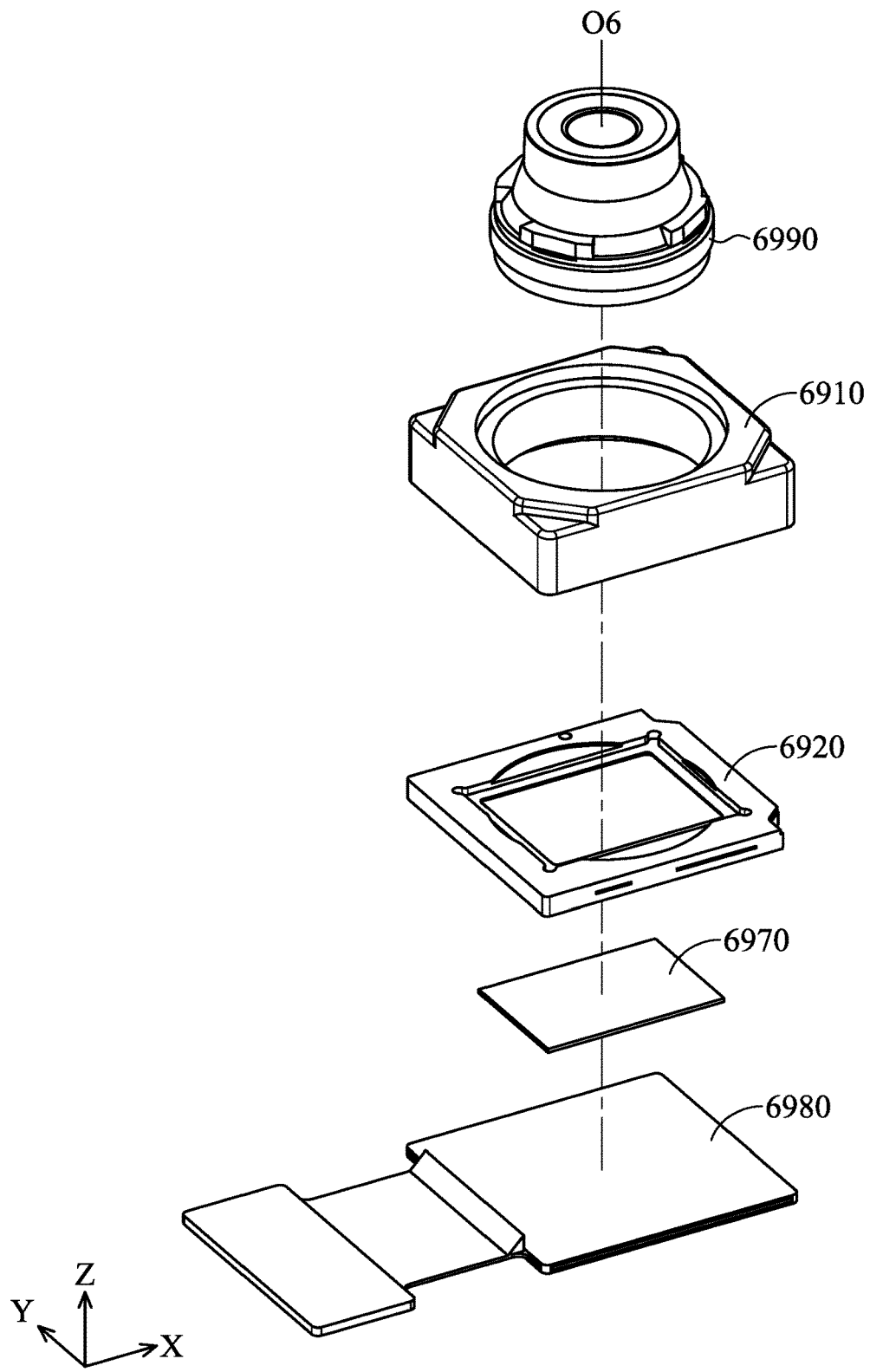
FIG. 4 is an exploded of an optical module.

As shown in FIG. 4, the optical module 6900 may include a frame 6910, a base 6920, and an optical element 6990 disposed between the frame 6910 and the base 6920. It should be noted that a case opening and a bottom opening are formed on the frame 6910 and the base 6920, respectively. The center of the case opening corresponds to the main axis O6 of the optical element 6990, and the base opening corresponds to a photo sensor 6970, and the photo sensor 6970 may be disposed on a substrate 6980. As a result, the optical element 6990 disposed in the optical module 6900 may focus with the photo sensor 6970 along the main axis O6 (i.e. Z direction).

Furthermore, a moving assembly (not shown) which is movable relative to the frame 6910 and the base 6920 may be disposed in the optical module 6900, and the optical element 6990 may be fixed on the movable assembly, such as by locking, gluing, or engaging. Furthermore, additional driving component may be provided in the optical module 6900, such as an assembly of a magnet and a coil (not shown), to move the optical element 6990 with the movable assembly in a direction that is different than the moving direction of the movable portion 6300. As a result, the optical element 6990 may be moved in more directions. For example, the optical element 6990 may be moved on X, Y, or Z direction.

The substrate 6980 may be, for example, a flexible printed circuit, which may be affixed on the base 6920 by adhesion. In some embodiments, the substrate 6980 is electrically connected to other electronic elements disposed inside or outside the optical module 6900. For example, the substrate 6980 may send electric signal to the driving component to control the movement of the movable assembly in X, Y or Z direction.

It should be noted that, as shown in FIG. 3, the distance between the top surface 6200A of the case 6200 and the bottom surface 6210A of the base 6210 is H16 (i.e. the total height of the optical element driving mechanism 6100). The distance between the top surface 6910A of the frame 6910 and the bottom surface 6210A of the base 6210 is H26. The distance between the top surface 6990A of the optical element to the bottom surface 6210A of the base 6210 is H36. The distance H16 may be designed to be less than the distance H26 or the distance H36 to reduce the total height of the optical element driving mechanism 6100, so that miniaturization may be achieved.

Figure 5:
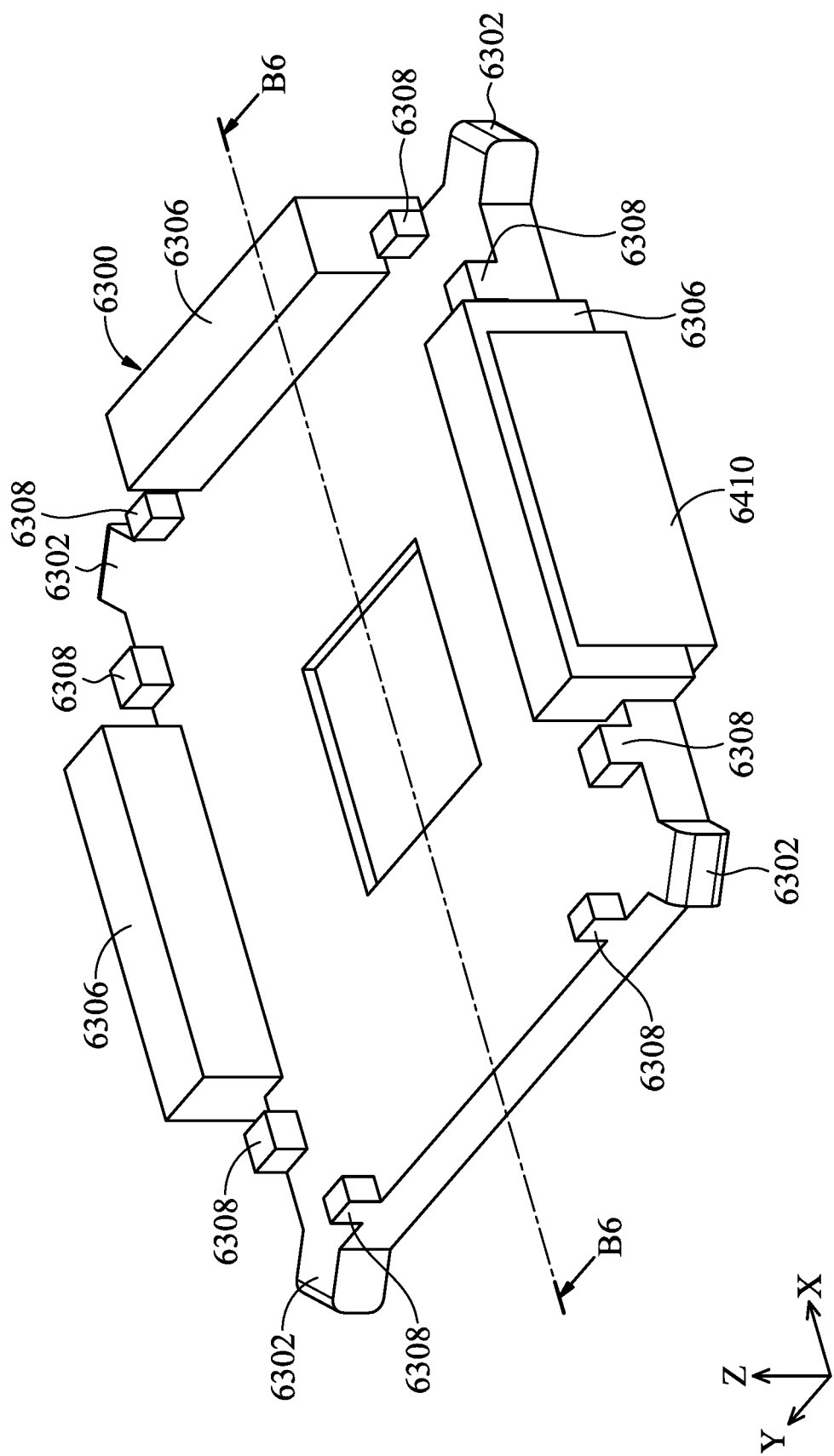
FIG. 5 is a schematic view of some elements of the optical element driving mechanism.
Figure 6:
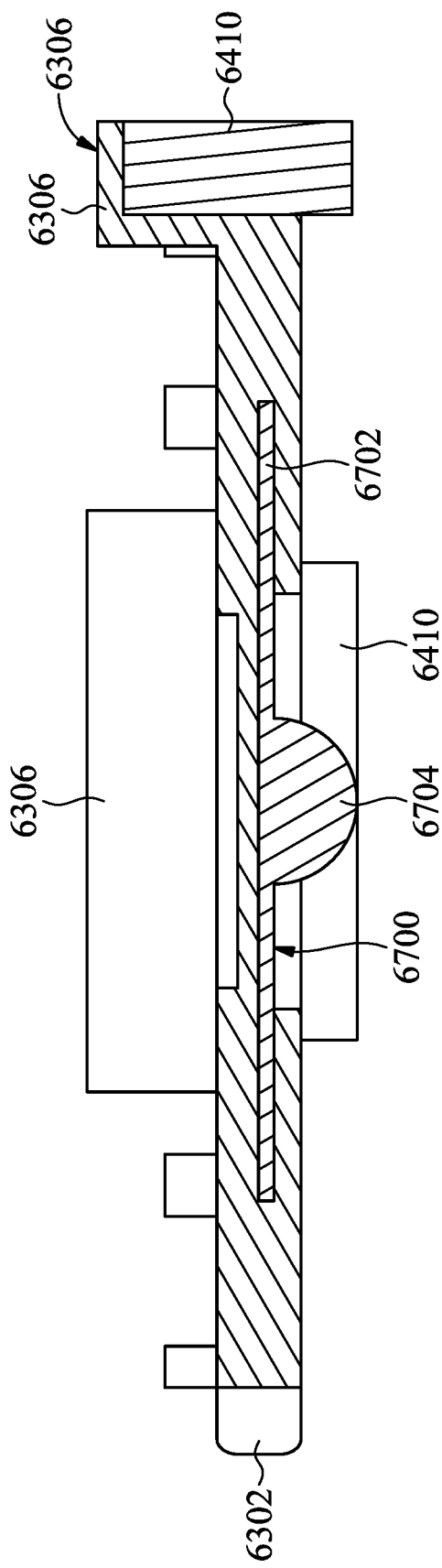
FIG. 6 is a cross-sectional view of some elements of the optical element driving mechanism.

FIG. 5 is a schematic view of some elements of the optical element driving mechanism 6100, and FIG. 6 is a cross-sectional view illustrated along line B6-B6 in FIG. 5. The movable portion 6300 has a substantially rectangular shape, limiting portions 6302 may be formed on the corners of the movable portion 6300, and the limiting portions 6302 may extend in the XY plane. Furthermore, a plurality of protruding portions 6306 may be formed on sides of the movable portion 6300, and a recess is formed in the protruding portion 6306 to accommodate the first magnetic element 6410. Protruding portions 6308 may be formed on opposite sides of the protruding portion 6306 to define the position of the optical module 6900.

It should be noted that, in FIG. 6, the support element 6700 is partially embedded in the movable portion 6300 and includes an embedded portion 6702 embedded in the movable portion 6300 and an exposed portion 6704 that is at least partially exposed from the movable portion 6300. The embedded portion 6702 may have a plate shape, and the exposed portion may have a half-spherical shape. The movable portion 6300 may be rotated in different directions (such as rotate relative to X, Y or Z axis) by making the exposed portion 6704 having a half-spherical shape exposed from the movable portion 6300.

Figure 7:
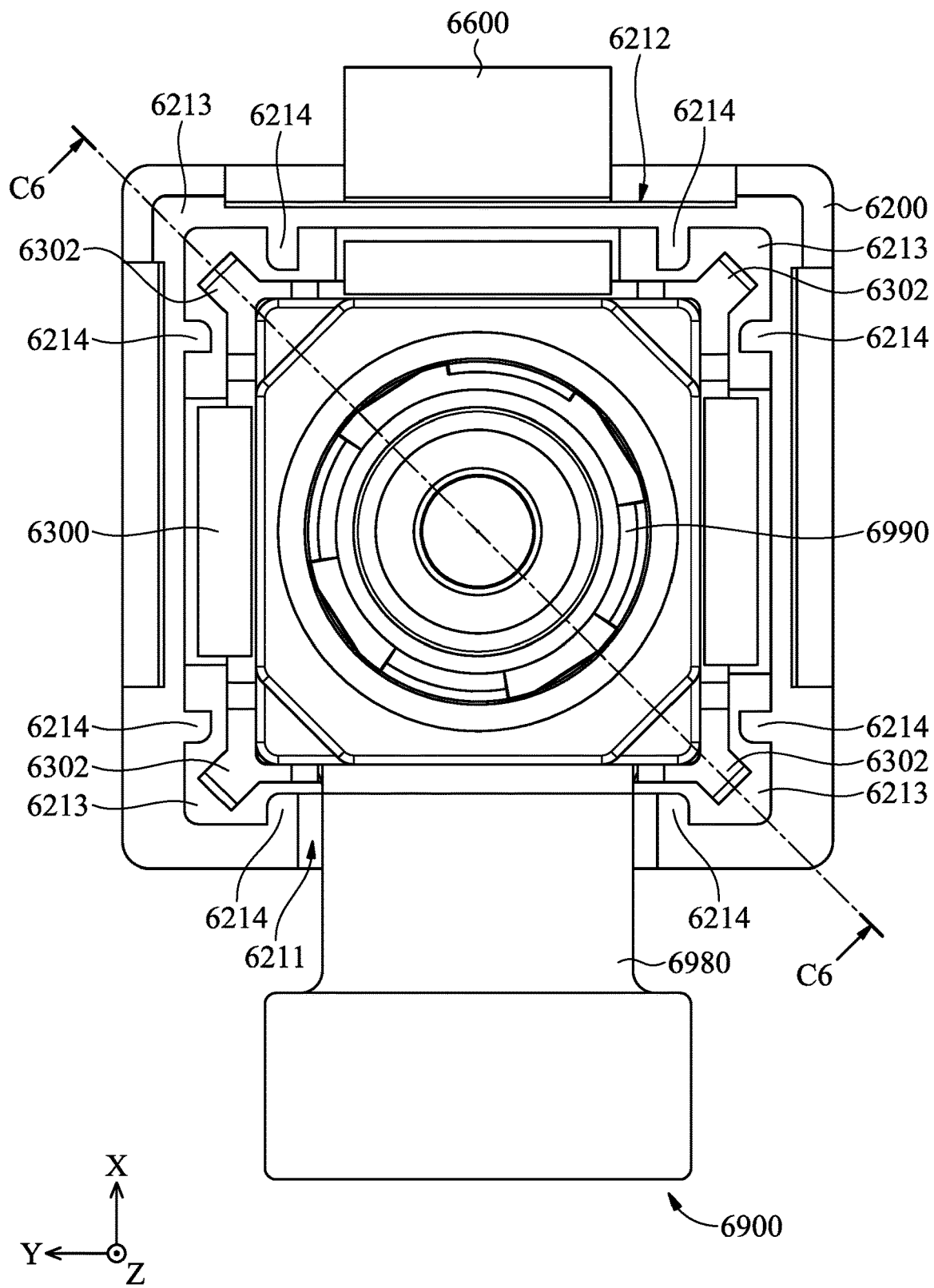
FIG. 7 is a top view of the optical element driving mechanism.
Figure 8:
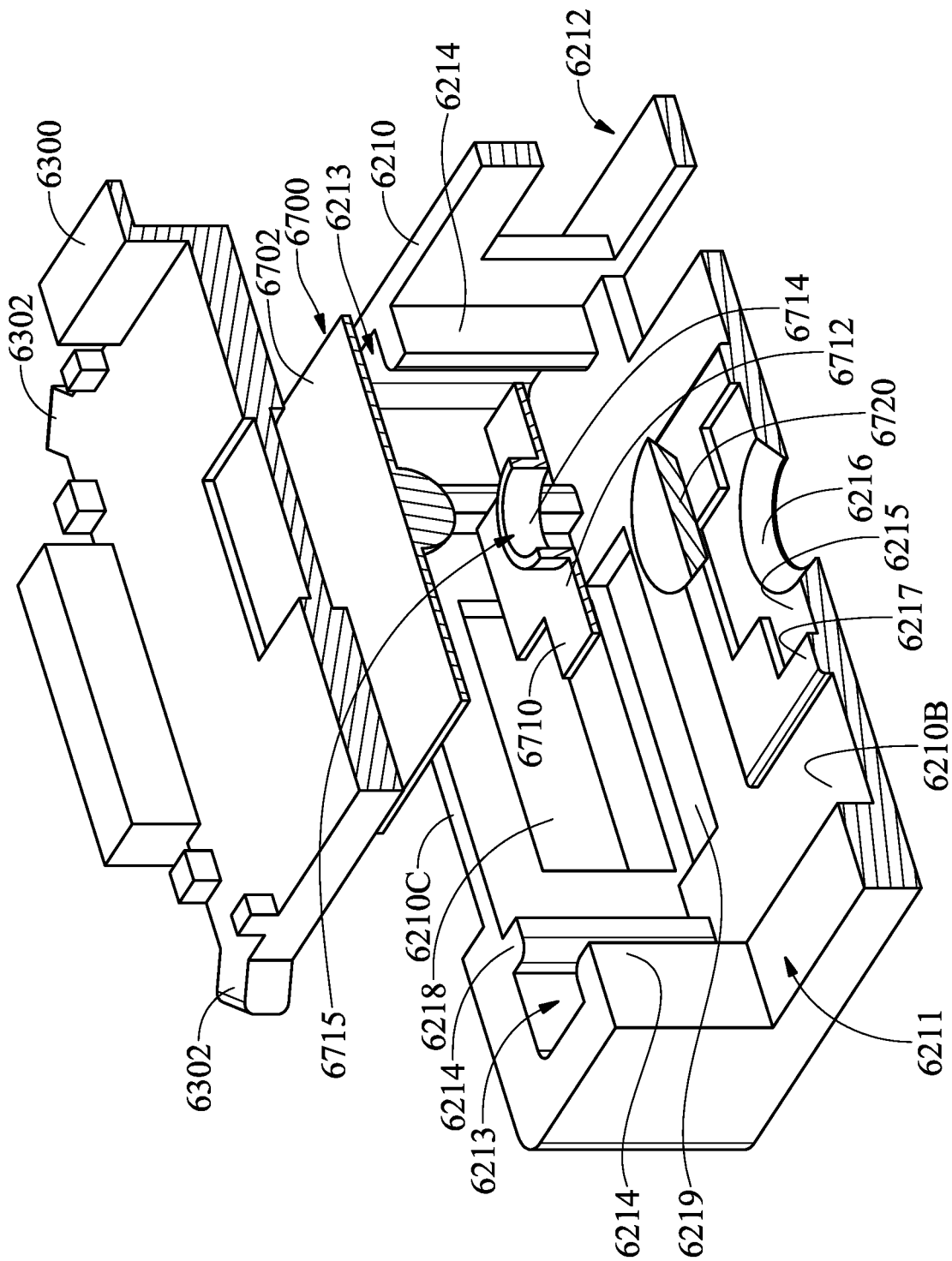
FIG. 8 is a schematic view of some elements of the optical element driving mechanism.

FIG. 7 is a top view of the optical element driving mechanism 6100, and FIG. 8 is a schematic view of some elements of the optical element driving mechanism 6100. In FIG. 7, the substrate 6980 and the circuit board 6600 are exposed from the opening 6211 and the opening 6212 of the base 6210, respectively, wherein the opening 6211 and the opening 6212 are positioned on different sides of the optical element driving mechanism 6100 (such as positioned on opposite sides). In other words, the outlet of the circuit of the optical element driving mechanism 6100 and the outlet of the circuit of the optical module 6900 are positioned on different sides of the optical element driving mechanism 6100 to reduced required space.

In some embodiments, the limiting portions 6302 of the movable portion 6300 are positioned at the corner spaces 6213 of the base 6210. When the movable portion 6300 is moving relative to the fixed portion F6, the limiting portion 6302 may be accommodated in the corner space 6213 and is movable, and the movable range of the movable portion 6300 relative to the fixed portion F6 may be limited by making the limiting portions 6302 and the protruding portions 6214 adjacent to the corner spaces 6213 colliding with each other.

In FIG. 8, the base 6210 may include a main body 6210B and a sidewall 6210C, a recess 6215, a first opening 6216 positioned in the recess 6215, and a protruding portion 6217 surrounding the recess 6215 may be formed on the main body 6210B. The main body 6210B has a surface that is perpendicular to the main axis O6 (FIG. 2). The first opening 6216 is formed on the main body 6210B. Furthermore, a limiting element 6710 and a magnetic permeable element 6720 may be positioned between the movable portion 6300 and the base 6210. The magnetic permeable element 6720 may be disposed in the first opening 6216, and the limiting element 6710 may be disposed in the recess 6215. Furthermore, the limiting element 6710 may have a connecting portion 6712 and a column 6714. The column 6714 extends along the main axis O6 (FIG. 2). The connecting portion 6712 may be disposed in the recess 6215, and the position of the limiting element 6710 may be defined by the protruding portion 6217. In some embodiments, the connecting portion 6712 may have a criss-cross shape to further design the position of the limiting element 6710. An opening 6715 may be formed in the column 6714, and the exposed portion 6704 of the support element 6700 may be disposed in the opening 6715.

Figure 9:
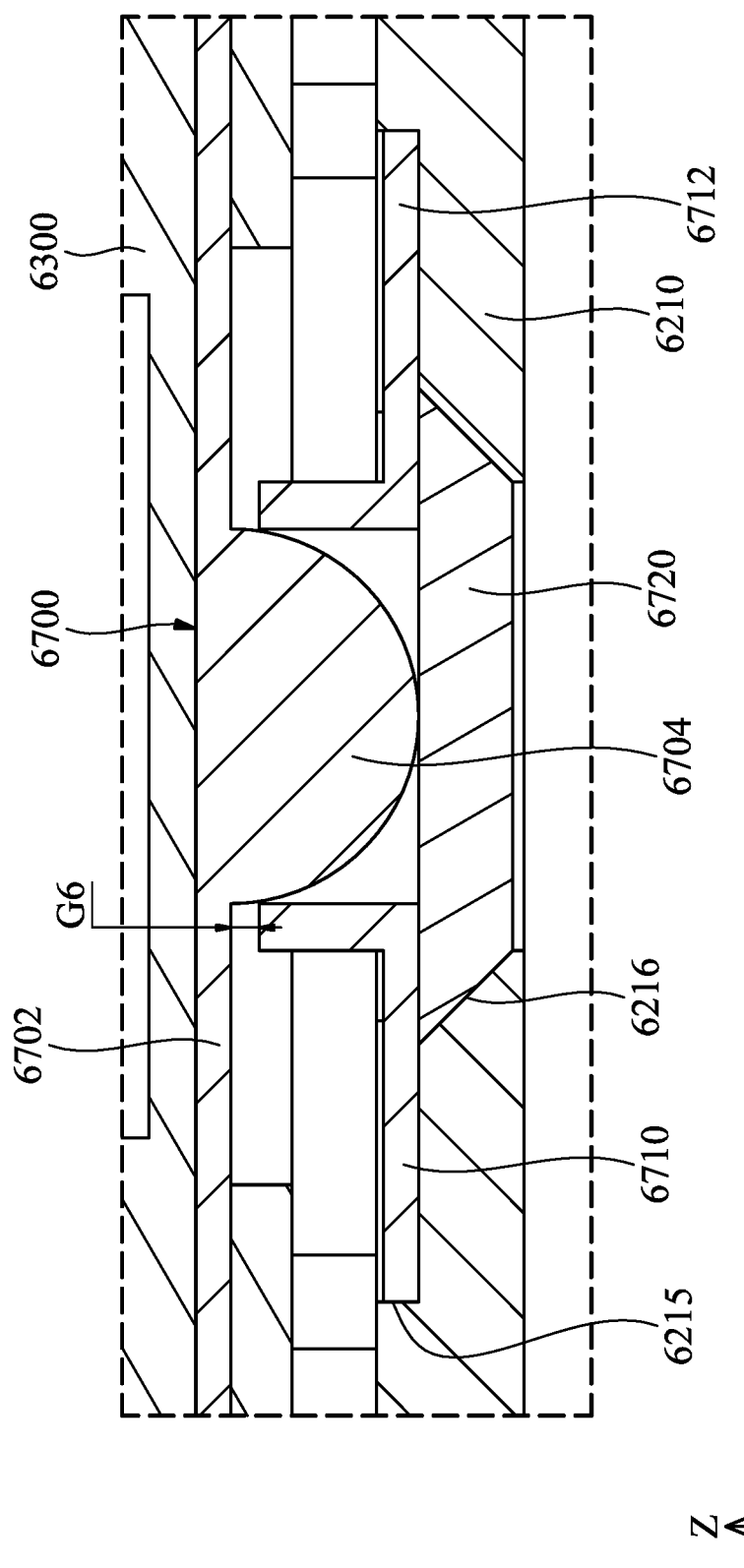
FIG. 9 is a cross-sectional view of some elements of the optical element driving mechanism.

FIG. 9 is an enlarged cross-sectional view of some elements in FIG. 8. In the cross-sectional view, the magnetic permeable element 6720 and the first opening 6216 may have trapezoid shapes to prevent the magnetic permeable element 6720 falling out from the first opening. Furthermore, a gap G6 may be formed between the embedded portion and the limiting element 6710 to allow the movable portion 6300 moving relative to the support element 6700. In some embodiments, the first opening 6216 may be replaced by a concave portion, and the magnetic permeable element 6720 may be disposed in the concave portion to increase the structural strength of the base 6210. In other words, the magnetic permeable element 6720 is not exposed from the base 6210 when viewed in the −Z direction.

In some embodiments of the present disclosure, as shown in FIG. 8, a second opening 6218 may be formed on the sidewall 6210C of the base 6210, so the driving assembly D6 (such as the second magnetic element 6420) may be disposed in the second opening 6218, and the weight of the base 6210 may be reduced. Furthermore, in some embodiments, a third opening 6219 may be formed on the main body 6210B of the base 6210 to prevent the movable portion 6300 and the first magnetic element 6410 from directly colliding to the base 6210 when the movable portion 6300 and the first magnetic element 6410 are moving.

Figure 10:
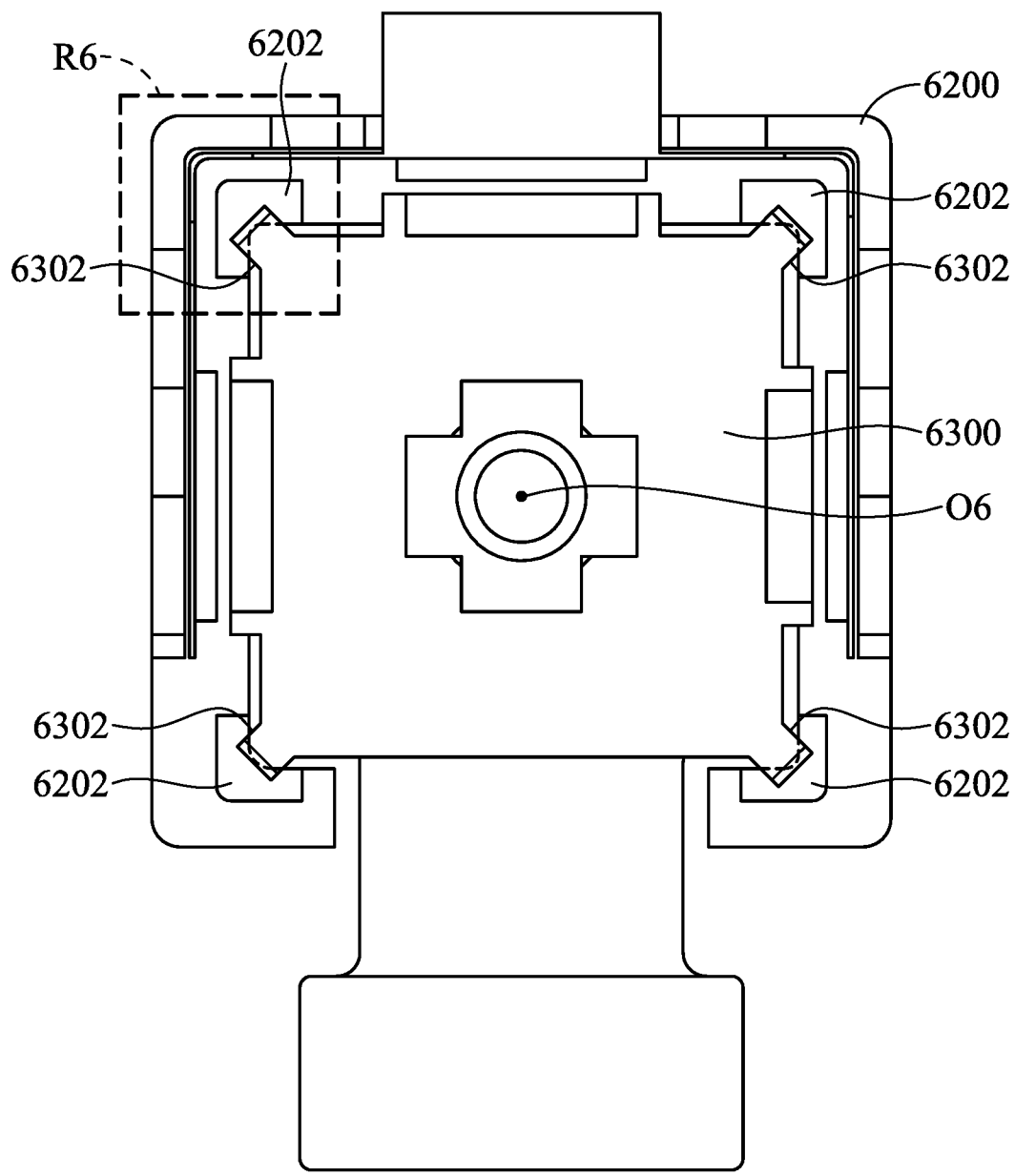
FIG. 10 is a bottom view of some elements of the optical element driving mechanism.
Figure 11:
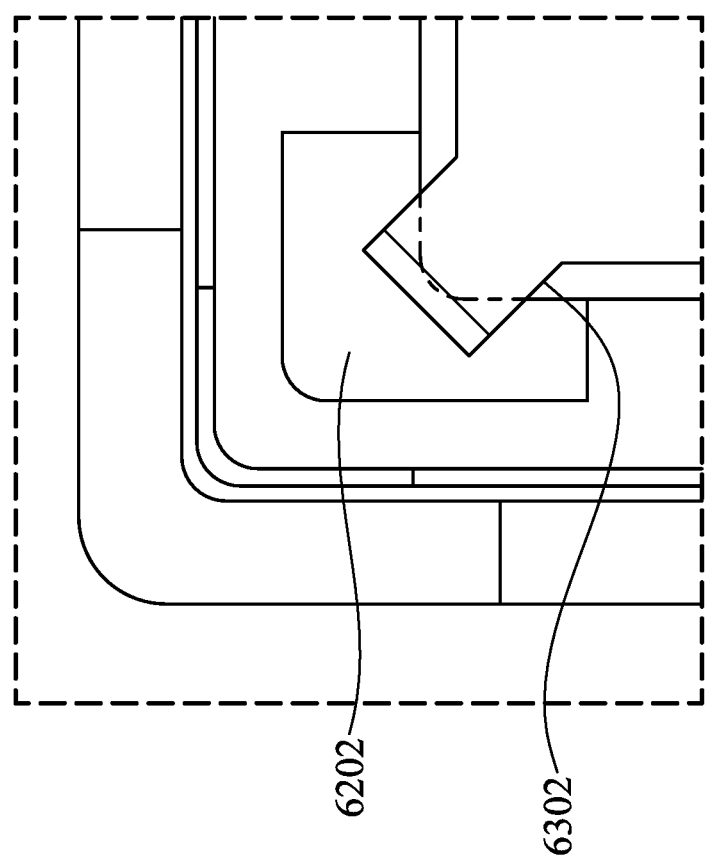
FIG. 11 is an enlarged view of FIG. 10.
Figure 12:
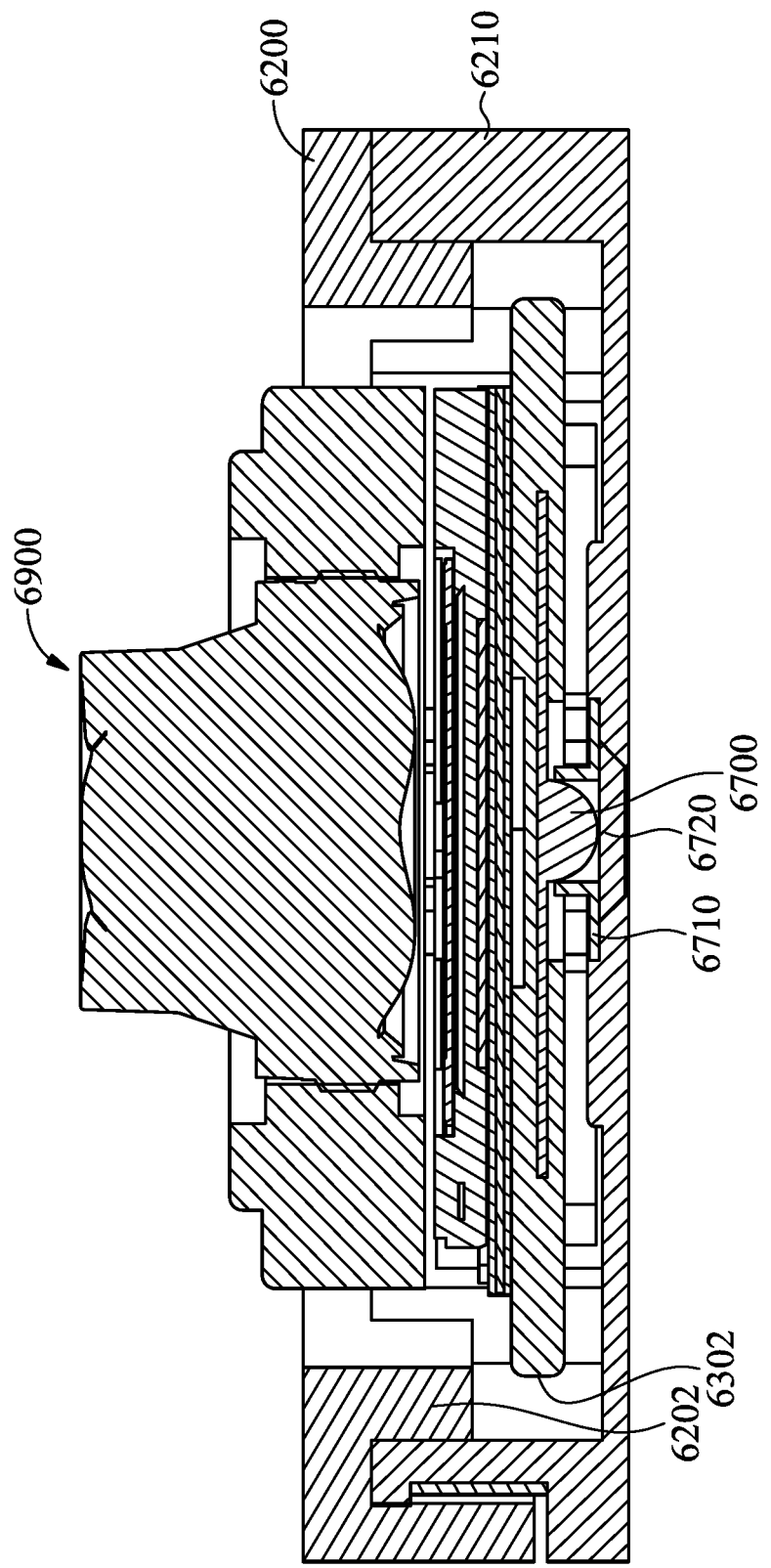
FIG. 12 is a cross-sectional view of the optical element driving mechanism.

FIG. 10 is a bottom view of the optical element driving mechanism 6100, wherein the base 6210 is not shown. FIG. 11 is an enlarged view of the portion R6 in FIG. 10, and FIG. 12 is a cross-sectional view illustrated along line C6-C6 in FIG. 7. As shown in FIG. 12, the case 6200 has a stopping portion 6202 extending to the base 6210 (i.e. extending in −Z direction). When viewed along the main axis O6 (−Z direction), as shown in FIG. 10 and FIG. 11, the stopping portion 6202 at least partially overlaps the limiting portion 6302 of the movable portion 6300. In other words, the movable range of the movable portion 6300 may be defined by the colliding between the limiting portion 6302 and the stopping portion 6202 when the movable portion 6300 is moving, so the assisting assembly AS6 may be prevented from detached from the movable portion 6300 and the fixed portion F6.

Figure 13:
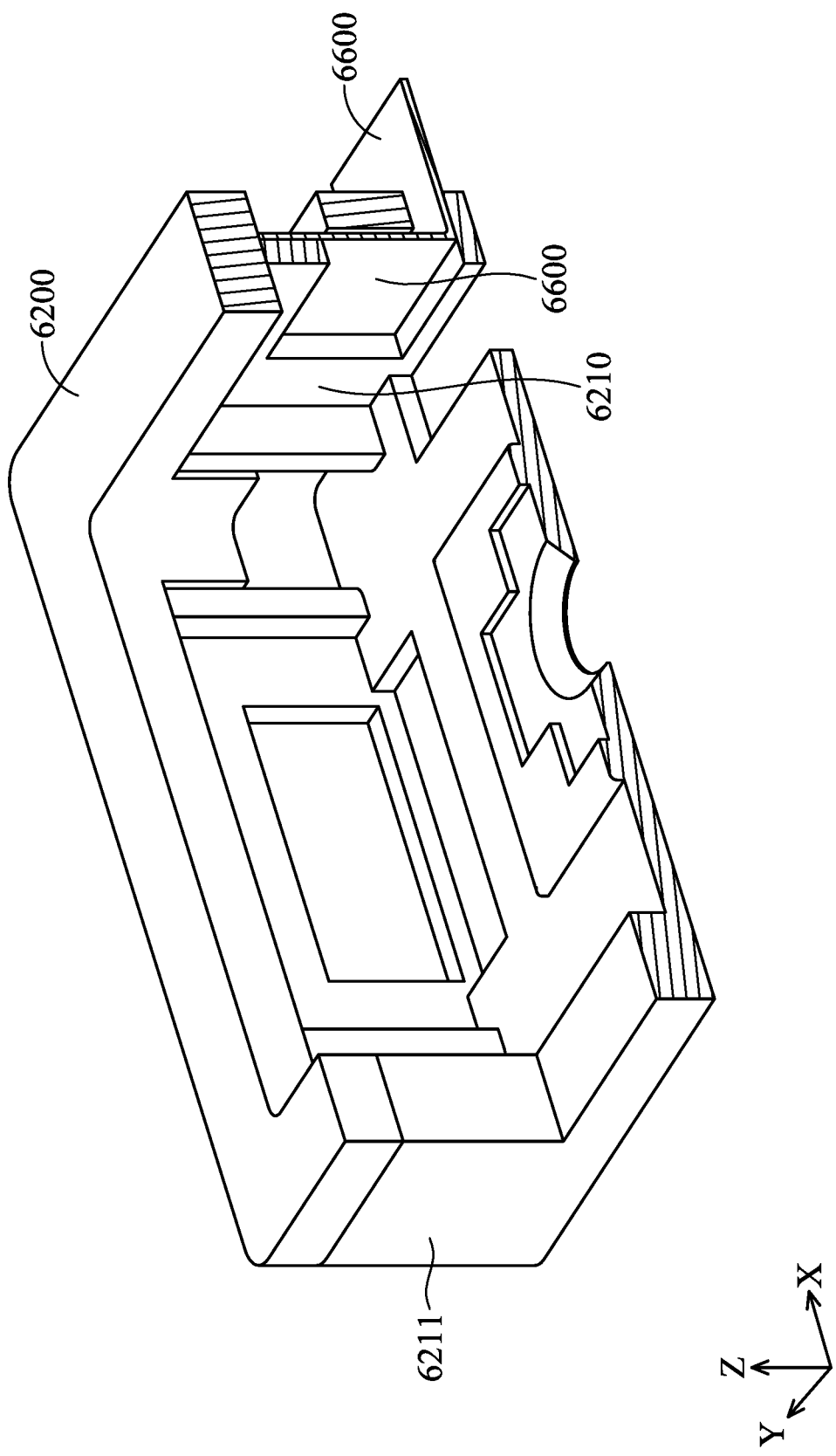
FIG. 13 is a schematic view of some elements of the optical element driving mechanism.
Figure 14:
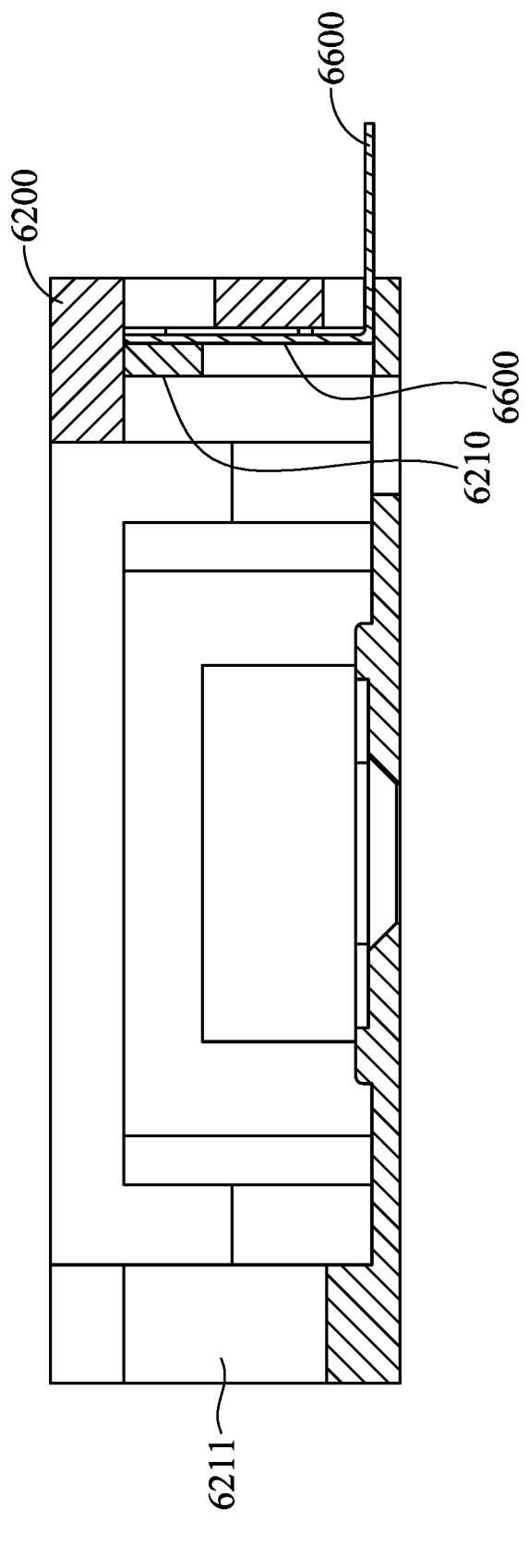
FIG. 14 is a cross-sectional view of some elements of the optical element driving mechanism.

FIG. 13 and FIG. 14 are a schematic view and a cross-sectional view of the case 6200, the base 6210 and the circuit board 6600. As shown in FIG. 13 and FIG. 14, the circuit board 6600 may be sandwiched between the case 6200 and the base 6210. For example, when viewed in a direction that is perpendicular to the main axis O6, the case 6200, the base 6210, and the circuit board 6600 at least partially overlap each other. As a result, the circuit board 6600 may be protected from being damaged by external impact.

In some embodiments, additional blocking element (not shown) may be provided on the optical element driving mechanism 6100 or the optical module 6900 to prevent external dust from entering the optical module 6900 when the optical element driving mechanism 6100 or the optical module 6900 is operating.

Figure 15:
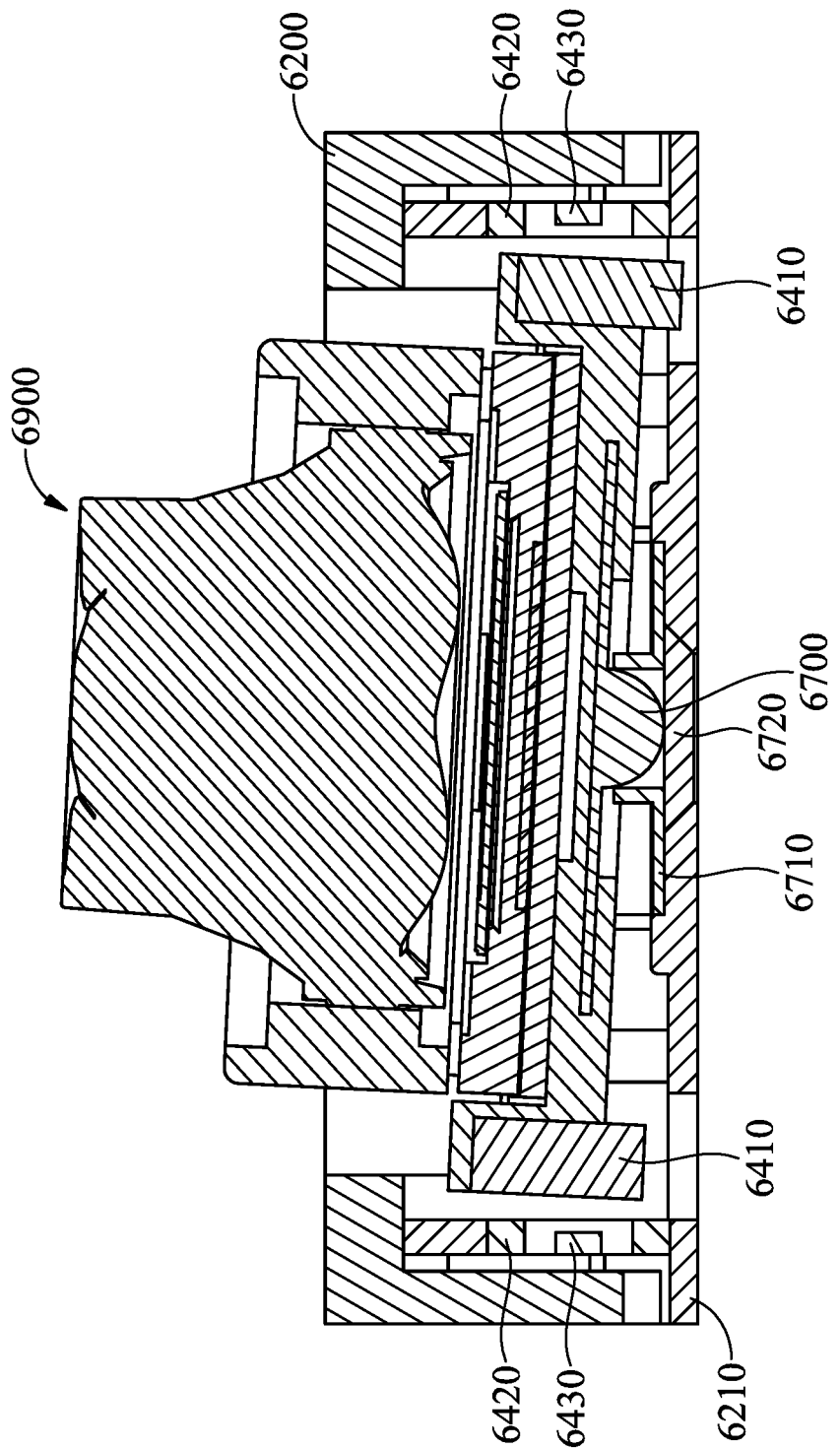
FIG. 15 is a cross-sectional view of the optical element driving mechanism when the optical element driving mechanism is moving in a direction.

FIG. 15 is a cross-sectional view of the movable portion 6300 of the optical element driving mechanism 6100 and other elements disposed on the movable portion 6300 when these elements rotate in Y axis relative to the fixed portion F6. As shown in FIG. 15, the movable portion 6300 and the optical module 6900 disposed on the movable portion 6300 may use the spherical support element 6700 as a fulcrum to rotate in different directions by the force generated from the driving assembly D6. Although the embodiment in FIG. 15 only shows the movable portion 3301 rotating in a single axis, but it should be noted that the movable portion 3301 may rotate in more than one axes, such as X, Y, and Z axes, to achieve optical image stabilization (OIS).

In summary, an optical element driving mechanism is provided. The design of the present disclosure provides the optical element with additional directions of motion, so the performance of the optical module is improved, and miniaturization can be achieved.

Although embodiments of the present disclosure and their advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope of such processes, machines, manufacture, and compositions of matter, means, methods, or steps. In addition, each claim constitutes a separate embodiment, and the combination of various claims and embodiments are within the scope of the disclosure.

What is claimed is:
1. An optical element driving mechanism, comprising:
  a movable portion for connecting to an optical element having a main axis;
  a fixed portion, wherein the movable portion is movable relative to the fixed portion;
  a driving assembly disposed on the movable portion or the fixed portion for driving the movable portion to move relative to the fixed portion; and
  an assisting assembly, comprising a support element and a limiting element, wherein the limiting element is affixed on the fixed portion, and the movable portion is movably connected to the fixed portion through the assisting assembly;

wherein the support element is partially embedded in the movable portion, and the support element comprises an embedded portion embedded in the movable portion and an exposed portion that is at least partially exposed from the movable portion, wherein the embedded portion have a plate shape, and the exposed portion have a half-spherical shape;

wherein the limiting element has a column extending along the main axis, an opening is formed in the column, and the exposed portion of the support element is disposed in the opening.

2. The optical element driving mechanism as claimed in claim 1, wherein the assisting assembly further comprises a magnetic permeable element, and the limiting element is disposed between the magnetic permeable element and the support element.

3. The optical element driving mechanism as claimed in claim 2, wherein the magnetic permeable element has a trapezoid shape when viewed in a direction that is perpendicular to the main axis.

4. The optical element driving mechanism as claimed in claim 1, wherein the fixed portion comprises a base having a first opening, the main axis passes through the first opening, and the assisting assembly is partially disposed in the first opening.

5. The optical element driving mechanism as claimed in claim 1, wherein the fixed portion comprises a base having a concave portion, the main axis passes through the concave portion, and the assisting assembly is at least partially disposed in the concave portion.

6. The optical element driving mechanism as claimed in claim 1, wherein the movable portion and the fixed portion have rectangular shapes, a limiting portion is formed on a corner of the movable portion, a corner space is formed on the corner of the fixed portion, and the limiting portion is accommodated in the corner space.

7. The optical element driving mechanism as claimed in claim 1, further comprising a blocking element directly disposed on the optical element or the fixed portion.

8. The optical element driving mechanism as claimed in claim 1, wherein the optical element driving mechanism is connected to the optical element through an optical module, the optical module has a top surface, the optical element driving mechanism has a top surface and a bottom surface, and a distance between the top surface of the optical module and the bottom surface of the optical element driving mechanism is greater than a distance between the top surface of the optical element driving mechanism and the bottom surface of the optical element driving mechanism.

9. The optical element driving mechanism as claimed in claim 1, wherein the fixed portion and the movable portion comprise identical material.

10. The optical element driving mechanism as claimed in claim 9, wherein the material comprises resin or metal.

11. The optical element driving mechanism as claimed in claim 1, wherein the limiting element comprises a connecting portion affixed on the fixed portion.

12. The optical element driving mechanism as claimed in claim 11, wherein the connecting portion has a criss-cross shape.

13. The optical element driving mechanism as claimed in claim 1, further comprising a circuit board, and the circuit board and the fixed portion at least partially overlap each other when viewed in a direction that is perpendicular to the main axis.

14. The optical element driving mechanism as claimed in claim 13, wherein the fixed portion comprises a case, and the circuit board and the case at least partially overlap each other when viewed in the direction that is perpendicular to the main axis.

* * * * *